Figure 2:
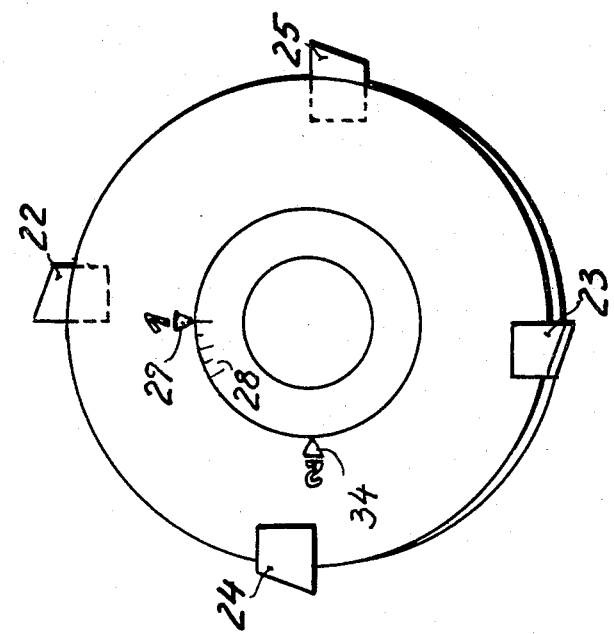

United States Patent [19] [11] 3,848,512
Erhardt [45] Nov. 19, 1974

[54] MILLING TOOL FOR WORKING OF GROOVES OR SLOTS

[75] Inventor: Manfred Erhardt, Munich, Germany

[73] Assignee: Carl Hurth Maschinen- und Zahnradfabrik, Munich, Germany

[22] Filed: May 8, 1972

[21] Appl. No.: 251,348

[30] Foreign Application Priority Data
June 25, 1971 Germany............................ 2131581

[52] U.S. Cl. .................................. 90/11 A, 144/238
[51] Int. Cl. ............................................. B23c 1/02
[58] Field of Search ...... 29/104, 103, 105; 144/222, 144/238, 239; 90/11

[56] References Cited
UNITED STATES PATENTS
2,286,633 6/1942 McCabe.................................. 90/11
2,544,814 3/1951 Warren................................. 144/238
2,925,108 2/1960 Freeman........................ 144/238 X FOREIGN PATENTS OR APPLICATIONS
850,518 9/1952 Germany ............................ 144/238
1,475 11/1865 Great Britain ...................... 144/238
499,356 11/1970 Switzerland.......................... 90/11 X OTHER PUBLICATIONS
Western Saw Mfgs. Inc., Dado Assembly Oct. 8, 1953.

Primary Examiner—Andrew R. Juhasz
Assistant Examiner—William R. Briggs
Attorney, Agent, or Firm—Woodhams, Blanchard & Flynn

[57] ABSTRACT

Milling tool for fine cutting of slots or groove walls. Cutting points are angularly arranged around a generally disk shaped base member or carrier and said carrier is mounted on a spindle with the plane defined by said points positioned at an angle to a plane normal to said spindle. Rotation of the carrier with respect to the spindle will alter the axial position of the cutting tips with respect to the spindle. Thus, in one embodiment where the cutting tips are placed diametrically opposite each other on the carrier, rotation of the carrier with respect to the spindle will slightly alter the axial spacing between the cutting edges of said cutting tips. Thus, such rotation of the carrier with respect to the spindle may be utilized for fine adjustment of the cutting tips with respect to the walls of the slot or groove. This makes possible a very fine adjustment of the cutter for precise finish cutting of previously rough-cut slots and grooves. Spare cutting tips can also be mounted on the carrier at angular spacing from the initially active cutting tips, and later brought into operation while the initial cutting tips are removed from operation by rotation of the carrier with respect to the spindle. In any given adjusted position the carrier is, of course, locked nonrotatably with respect to said spindle.

4 Claims, 3 Drawing Figures

3,848,512

MILLING TOOL FOR WORKING OF GROOVES OR SLOTS

The invention relates to a milling tool for the cutting of grooves or slots with a disk-shaped cutter.

The purpose of the invention is to cut relatively narrow grooves or slots (for example 5 mm. wide, 10 mm. deep) with a high degree of precision, namely with a small width tolerance, good parallelism of the walls, small ripple and high surface quality (for example a peak-to-valley height of .7 μm. or 63 micro inches) and with a large percentage of contact area of the groove walls. As will be explained below, a reliable and exact adjustment of the cutting width during set-up and after sharpening is also desired. It is desirable that the cutting edges be exchangeable quickly and simply, while maintaining width dimension within predetermined tolerances and with a capability for rapid readjustment to an exact dimension. Further, it is desired to provide a fine adjustment for controlling the slot width within narrow limits (for example in the vicinity of a total of 0.05 mm.). The invention is directed particularly toward the finishing of rough cut grooves.

The invention, in attaining the above purposes, starts from the thought that absolute freedom for a tool exists only when one single tool cutting edge, namely one tool point, is operative for each machined surface. Since the tool life of any one cutter point is relatively short, it is important to be able to exchange and readjust the tools quickly.

The basic purpose of the invention is attained by arranging at a substantial angular spacing, as 180°, the respective cutting tools (or tool points) acting on each wall of the groove or slot and further by arranging the base or carrier for the tool points rotatably and fixably on the cutter spindle in such a manner that the axis of the base member is inclined to the axis of rotation of the cutter spindle. The thus diametrically oppositely positioned tool points operate each for itself individually. The planes which are tangent to the cutting edges and which are perpendicular to the axis of rotation of the tool spindle determine the width of the groove thus created. If the base member is rotated on the tool spindle, then the distance between these two planes changes and with it also the width of the groove or slot.

The above-outlined concept is embodied in a specific device in a simple manner by arranging the base member of the disk-shaped cutter on the cutter spindle between two sleeves or flanges or the like and causing the opposed surfaces of the sleeves, which surfaces face the base member, to be parallel to each other and inclined to the plane which is perpendicular to the axis of rotation of the spindle. Further, the plane surfaces of the base member are parallel to each other and perpendicular to its own axis.

For the purpose of a simple adjustment, the invention further provides that the base member on the one hand and the cutter spindle or a part connected therewith, for example a flange or the like, on the other hand are provided with dividing markings in order to be able to read the angle position of the cutting tips relative to the cutter spindle.

In order to exchange the tool cutting blades, the invention further provides that several pairs of tool cutting blades are arranged around the circumference of the base member of the cutter, in order to be able to exchange the effective cutting means on the tool spindle. Thus, it is for example possible to provide five pairs of cutting edges on one base member which in turn makes it possible to use for each groove wall successively five cutting edges without removing from the tool spindle the base member of the cutter for tool exchange. It is important to recognize that during this tool exchange the groove or slot width may be readjusted but not the groove or slot position. Thus, the slot width may be changed steplessly according to the invention.

A particular advantage of the milling tool according to the invention is its simple sharpening capability. A further advantage of the invention is that by careful adjustment of the width of the cutting tool according to the invention the position of the groove or the slot is not changed.

Further advantages and characteristics of the invention can be taken from the following description.

The invention is explained in connection with FIGS. 1 to 3, which illustrate

Figure 1:
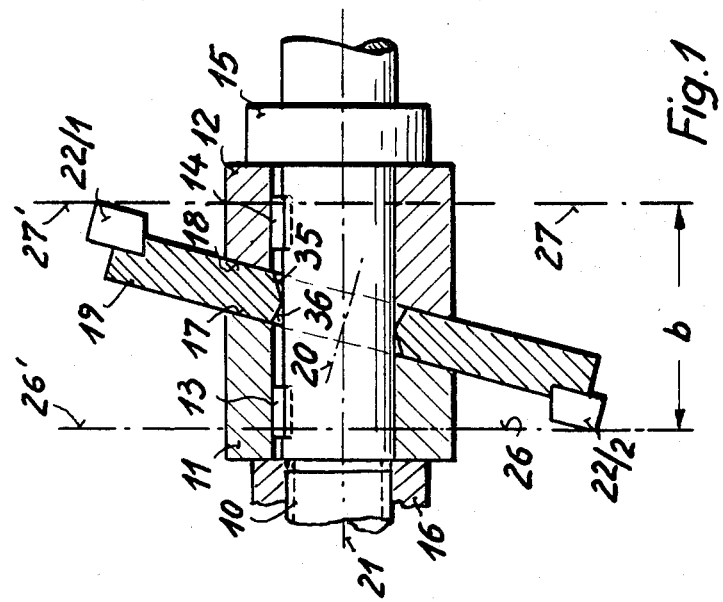
Figure 3:
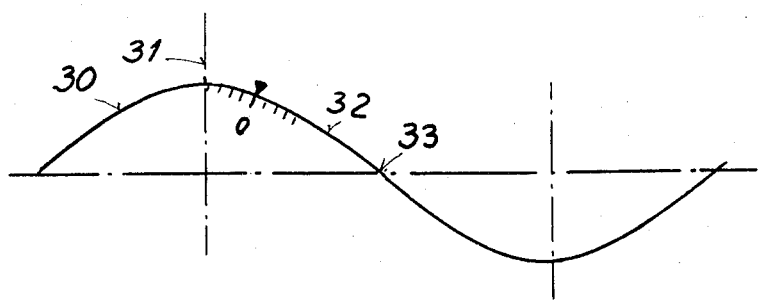

FIG. 1 a longitudinal cross-sectional view of an exemplary embodiment of the invention, FIG. 2 a front view of the cutter according to FIG. 1, FIG. 3 a diagram illustrating the operation of the adjusting mechanism according to the invention.

FIG. 1 illustrates one exemplary embodiment of the invention. Two sleeves 11, 12 which are secured against rotation relative to the tool spindle by means of keys 13, 14, are placed on a cutter spindle 10 which is received in a conventional manner in a machine tool and is driven in a conventional manner by a motor, if desired, through suitable gearing. The sleeves are held axially on one side through a collar 15 and on the other side through a clamp nut 16. Other known means can also be provided for holding in axial and in peripheral directions. The opposed faces 17, 18 of both sleeves are equally sloped or inclined parallel with respect to one another and are spaced at a distance proportional to the width of the groove or the slot which is to be made.

A disk-shaped base member 19 of a cutter is clamped between the two said faces. Since the faces of the disk-shaped base member are parallel to each other, the base member is received so that its axis 20 is inclined to the axis of rotation 21 of the tool spindle. A number of pairs of cutting points are mounted around the periphery of the base member, for example by soldering or by clamping with known means. The two cutting edge pairs 22, 23 (or 24, 25) are diametrically opposite one another. The cutting edges are arranged in such a manner that only the cutting edges 22, 23 which are here chosen for initial operation can contact the axially facing walls of the groove or slot 26, 27. The said cutting points thus become effective and the two other cutting points 24, 25 are spares. When the effective cutting edges are dull, in the exemplary embodiment the base member 19 is rotated 90° on the tool spindle and the previously spare cutting edges now become active by moving same into a cutting position defined by a position axially spaced the furthest from a plane extending perpendicular to the axis of said spindle means at the midpoint between the pair of cutting edges. FIG. 2 illustrates only an example. It is possible to also provide more than two spare cutting points.

The width "b" of the groove, namely, the space between the two axially facing groove walls 26, 27, is determined by the two planes 26', 27' which are positioned perpendicularly to the tool spindle axis 21 and are tangent to the two effective cutting edges. The distance between these two planes changes when the base member 19 is rotated on the tool spindle. The invention uses this function for the fine adjustment of the slot width. For this purpose, for example, a scale 28 is provided on one of the sleeves and a mark 29 on the base member. (In FIG. 2 the scale is illustrated on one face in order to make it visible although in an actual construction it is preferably provided on the circumference of the sleeve near the mark). The arrangement of the scale is illustrated in FIG. 3. If the base member is rotated relatively to the sleeves, the cutting edges effect a movement in the axial direction according to a sine curve 30. The greatest width of the groove or the slot is produced when the effective cutting edges lie on the culmination point 31. The smallest width exists when the effective cutting edges lie on a point 32 which is closer to the zero point 33. The point 32 can in most cases actually be placed very close to the zero point to effect a very fine cut without causing either of the spare cutting points to contact the groove walls. The zero mark for the normal width of the groove is placed in the center between the thus determined extreme positions. Upon a rotation to the right or to the left, the groove is then made wider or more narrow, whereby the cutting adjustment is extremely fine. FIG. 2 shows the scale in the condition for the greatest groove width.

A second mark 34 for the second pair of cutting edges is provided offset 90° to the mark 29 on the base member. If more pairs of cutting edges should be provided than are illustrated, then for the further pairs of cutting edges further correspondingly positioned marks are provided in order to be able to adjust the spare pairs of cutting edges also on the sacle 28.

The coarse adjustment for the groove or the slot is accomplished by exchanging the sleeves 11, 12 with differently inclined faces 17, 18. In order that the base member 19 can be adjusted to different inclinations, its central bore is provided with cones 35, 36 which are enlarged toward the faces.

Of further importance to the invention is a method for creating precise grooves or slots which method consists in first roughly machining the groove or the slot with a normal multi-edged form cutter or with a cross-toothed form cutter and thereafter finish machining the groove or slot walls with the cutting tool of the present invention, whereby the groove or slot is brought to the exact dimension.

A particular advantage of the milling tool according to the invention is its ease of sharpening, particularly in that the cutter is received in the sharpening machine with its base member perpendicular to the spindle of the sharpening machine. Usually disk-shaped cutters diminish in width during sharpening and this is undesirable if they are used as form cutters for the grooves or slots. This is not harmful in the case of the milling tool according to the invention, since its width can be adjusted.

The embodiments of the invention for which an exclusive property or privilege is claimed are defined as follows:

1. A disk-shaped tool for cutting on axially facing walls, comprising:

means defining a rotatable cutter spindle;

a pair of hollow sleeves mounted on said spindle and key means for locking said hollow sleeves to said spindle for rotation therewith, said hollow sleeves having opposed inclined and parallel axially facing surfaces thereon defining a gap therebetween;

a base member, the axis of which is inclined to the spindle axis, mounted on said spindle and being engaged on opposite sides thereof by said inclined and parallel surfaces on said pair of hollow sleeves, said base member being rotatable relative to said spindle means and said pair of hollow sleeves;

a plurality of pairs of cutting means secured to said base member adjacent the periphery thereof, each of said cutting means having at least one cutting edge thereon adapted to cut substantially in an axial direction, each of said cutting means in each pair being spaced 180° at the periphery of said base member, one of said cutting means being on one axially facing side of said base member and the other of said cutting means being on the other axially facing side of said base member, each cutting means being adapted to engage only one axially facing wall when said cutting means are in a cutting position defined by a position axially spaced the furthest from a plane extending perpendicular to the axis of said spindle means at the midpoint between said pair of cutting means, only one of said pairs of said cutting means being permitted to be positioned in said cutting position at a time; and means for axially moving said hollow sleeves toward each other to tightly clamp said base member therebetween, said means for tightly clamping said base member between said hollow sleeves being releasable to permit a relative rotation between said base member and said spindle means to bring another one of said pairs of said cutting means into said cutting position.

2. A disk-shaped tool according to claim 1, wherein said base member is disk-shaped.

3. A disk-shaped tool according to claim 1, wherein said base member and one of said hollow sleeves includes indicia means thereon for indicating the relative angular position between said cutting edges and said spindle means.

4. A disk-shaped tool for cutting oppositely facing walls, comprising:

means defining a rotatable cutter spindle;

a base member mounted on said spindle and rotatable with respect thereto;

releasable securing means for releasably securing said base member to said spindle for rotation therewith; and a plurality of pairs of cutting means secured to said base member adjacent the periphery thereof, said cutting means in each pair being spaced 180° at the periphery of said base member, each of said cutting means consisting of a cutter having at least one cutting edge thereon adapted to cut in only an axial direction, each of said cutting edges being angularly spaced at the periphery of said base member, one of said cutting edges on one of said cutters being on one axially facing side of said base member and the other of said cutting edges on the other of said cutters being on the other axially facing side of said base member, the angular spacing between each cutting edge permitting an engagement of only one of said oppositely facing walls when said cutting edges are in a cutting position defined by a position axially spaced the furthest from a plane extending perpendicular to the axis of said spindle means at the midpoint between said pair of cutting edges, only one pair of the pairs of cutting edges being permitted to be positioned in said cutting position at a time, said securing means being releasable to permit a relative rotation between said base member and said spindle means to bring another one of said pairs of said cutting edges into said cutting position.

* * * * *